US011375582B2

(12) United States Patent
Khalid et al.

(10) Patent No.: US 11,375,582 B2
(45) Date of Patent: Jun. 28, 2022

(54) SYSTEMS AND METHODS FOR SCALABLE EDGE-BASED MICROCONTROLLERS

(71) Applicant: Verizon Patent and Licensing Inc., Basking Ridge, NJ (US)

(72) Inventors: Mohammad Raheel Khalid, Budd Lake, NJ (US); Syed Meeran Kamal, South Plainfield, NJ (US); Lama Hewage Ravi Prathapa Chandrasiri, Franklin Park, NJ (US); Anbazhagan Palani, Somerset, NJ (US); Scott David Brown, Grayson, GA (US); Yadushri Baliyan, Metuchen, NJ (US); Kenneth W. Musante, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/072,966

(22) Filed: Oct. 16, 2020

(65) Prior Publication Data
US 2022/0124873 A1 Apr. 21, 2022

(51) Int. Cl.
*H04W 88/10* (2009.01)
*H04W 88/06* (2009.01)
(Continued)

(52) U.S. Cl.
CPC ....... *H04W 88/10* (2013.01); *H04W 28/0808* (2020.05); *H04W 72/0426* (2013.01);
(Continued)

(58) Field of Classification Search
None
See application file for complete search history.

(56) References Cited

U.S. PATENT DOCUMENTS 10,878,018 B1 * 12/2020 Aloisio .................. G06F 16/35
2019/0052553 A1 * 2/2019 Subramanian .......... H04L 69/22
(Continued)

OTHER PUBLICATIONS

Steve Cope, "Using MQTT Over WebSockets with Mosquitto" (available at http://www.steves-internet-guide.com/mqtt-websockets/, visited Aug. 7, 2020).
(Continued)

*Primary Examiner* — Kenny S Lin

(57) ABSTRACT

Embodiments described herein provide for the leveraging of edge-based resources (e.g., processing, memory, storage, and/or other resources of one or more Multi-Access/Mobile Edge Computing devices ("MECs"), such as MECs associated with a radio access network ("RAN") of a wireless network) to process data from and/or provide instructions to microcontroller devices, System on Chip ("SoC") devices, configurable logic boards, Internet of Things ("IoT") devices, and/or other types of devices or systems. For example, embodiments described herein may provide for the creation and configuration of logical devices or systems based on one or more microcontrollers, SoC devices, etc., edge-based processing of sensor data and/or other types of data received or generated by the microcontrollers, SoC devices, etc., and the generation of instructions to control physical devices communicatively coupled to the microcontrollers, SoC devices, etc.

20 Claims, 9 Drawing Sheets

(51) Int. Cl.
    *H04W 84/18*     (2009.01)
    *H04W 28/08*     (2009.01)
    *H04W 72/04*     (2009.01)
    *H04W 88/18*     (2009.01)

(52) U.S. Cl.
    CPC ........... *H04W 84/18* (2013.01); *H04W 88/06* (2013.01); *H04W 88/182* (2013.01)

(56) References Cited

U.S. PATENT DOCUMENTS

| | | | | |
|---|---|---|---|---|
| 2020/0174748 A1* | 6/2020 | Roberts | ................... | G06F 7/22 |
| 2020/0314614 A1* | 10/2020 | Moustafa | ............ | H04L 67/2842 |
| 2021/0021494 A1* | 1/2021 | Yao | ................... | H04L 41/5009 |
| 2021/0319098 A1* | 10/2021 | Pogorelik | ............... | G06N 3/08 |

OTHER PUBLICATIONS

Amazon Web Services, "AWS IoT Developer Guide" (available at https://docs.aws.amazon.com/iot/latest/developerguide/iot-dg.pdf, visited Aug. 7, 2020).

Arduino, "Arduino Introduction" (available at https://www.arduino.cc/en/guide/introduction, visited Aug. 11, 2020).

Arduino, "Arduino Uno Pin Diagram, Specification, Pin Configuration & Programming" (available at https://components101.com/microcontrollers/arduino-uno, visited Aug. 11, 2020).

\* cited by examiner

SYSTEMS AND METHODS FOR SCALABLE EDGE-BASED MICROCONTROLLERS

BACKGROUND

Some radio access networks ("RANs") may provide low latency wireless connectivity. Multi-Access/Mobile Edge Computing ("MEC") devices, referred to sometimes herein simply as ("MECs"), may be included in or implemented by RANs, such that relatively complex computing may be provided to wireless devices, such as mobile telephones, with relatively low latency.

DETAILED DESCRIPTION OF THE PREFERRED EMBODIMENTS

The following detailed description refers to the accompanying drawings. The same reference numbers in different drawings may identify the same or similar elements.

Embodiments described herein provide for the leveraging of edge-based resources (e.g., processing, memory, storage, and/or other resources of one or more MECs, such as MECs associated with a RAN of a wireless network) to process data from and/or provide instructions to microcontroller devices, System on Chip ("SoC") devices, configurable logic boards, Internet of Things ("IoT") devices, and/or other types of devices or systems. For example, embodiments described herein may provide for the creation and configuration of logical devices or systems based on one or more microcontrollers, SoC devices, etc., edge-based processing of sensor data and/or other types of data received or generated by the microcontrollers, SoC devices, etc., and the generation of instructions to control physical devices communicatively coupled to the microcontrollers, SoC devices, etc.

For example, a self-driving vehicle may include one or more controllable systems (e.g., braking systems, steering systems, engine management systems, infotainment systems, or the like), as well as one or more sensors or other types of input devices or systems (e.g., haptic sensors, accelerometers, gyroscopes, impact collision systems, Light Detection and Ranging ("LIDAR") systems, or the like). Such controllable systems and/or input devices or systems may include, may be implemented by, and/or may be communicatively coupled to one or more microcontrollers, SoC devices, etc. For the sake of brevity, examples are provided below in the context of "controllers." Further, it is to be understood that self-driving vehicles, as devices with a number of systems, controllers and sensors, are discussed herein for exemplary purposes only. In practice, similar concepts may apply to microcontrollers, SoC devices, configurable logic boards, IoT devices, and/or other suitable devices or systems. Further, for the sake of brevity, the term "self-driving vehicle" is used herein. In practice, similar concepts may apply to "autonomous" vehicles, "semi-autonomous" vehicles, "assisted driving" vehicles, etc. Further, while some examples described herein are provided in the context of "vehicles," in practice, similar concepts may apply to other suitable devices or systems, such as drones, smart home appliances, IoT devices, sensors, and/or any other suitable devices or systems.

Figure 1:
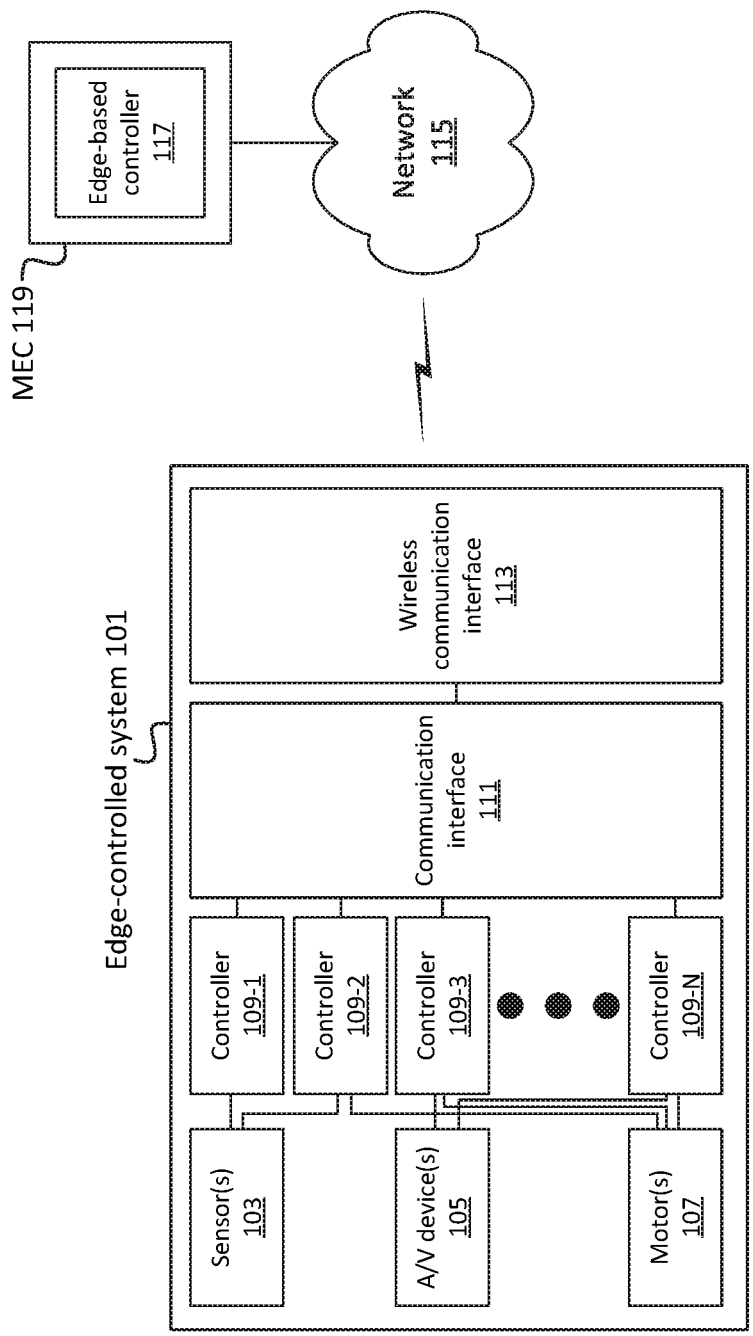
FIG. 1 illustrates an example overview of one or more embodiments described herein, in which an edge-controlled system of some embodiments may provide a communication interface between physical controllers of the system and a remote system via a wireless network.

As shown in FIG. 1, for example, an edge-controlled system 101 of some embodiments may include one or more sensors 103, audio/visual ("A/V") devices 105 (e.g., display screens, loudspeakers, microphones, etc.), motors 107, and/or other types of controllable devices or sensors. In some embodiments, edge-controlled system 101 may be, or may include portions (e.g., sub-systems) of, a self-driving vehicle, a drone, a "smart" home appliance, or other suitable type of device or system.

As further shown, edge-controlled system 101 may include one or more physical controllers 109, such as controllers 109-1 through 109-N. A particular controller 109 may include physical input and/or output ("I/O") components, such as pins, leads, wires, etc. that may output electrical signals to connected devices or systems, and/or which may receive electrical signals from connected devices or systems. For example, controller 109-1 may be communicatively coupled to one or more sensors 103. For example, sensor 103 may be physically connected to controller 109-1, such as through a pin, lead, wire, port, or some other suitable coupling mechanism. Controller 109-1 may, for example, receive signals (e.g., electrical signals) from sensor 103, where the signals represent information sensed by sensor 103. For example, if sensor 103 includes an accelerometer situated within a vehicle, the electrical signals provided to controller 109-1 may be associated with acceleration-based vehicle motion sensed by the accelerometer.

Similarly, controller 109-2 may be communicatively coupled to one or more sensors 103 and one or more motors 107. For example, controller 109-2 may receive sensor data from sensor 103, and may output instructions to motor 107, such as instructions to power motor 107 on or off, apply a given amount of power to motor 107, and/or otherwise manipulate, actuate, control, etc. motor 107.

Controllers 109 may further include one or more other components not explicitly shown in the figure, for the sake of clarity. For example, controllers 109 may include one or more data ports or interfaces, such as an Ethernet port, a Universal Serial Bus ("USB") port, a serial I/O port, a Universal Asynchronous Receiver/Transmitter ("UART") port, an Inter-Integrated Circuit ("I²C") port, or the like, via which controllers 109 may communicate with communication interface 111. Further, controllers 109 may include one or more analog-to-digital converters ("ADCs"), which may convert analog signals (e.g., signals received from one or more connected devices, such as sensors 103) into digital signals. Such digital signals may be provided to communication interface 111 via the one or more data ports of controller 109. Additionally, or alternatively, controller 109 may pass analog signals to communication interface 111, and communication interface 111 may convert the analog signals to digital signals. When providing signals (e.g., analog or digital signals) to communication interface 111, controller 109 may indicate a particular pin (or other suitable interface) via which the signals were received. For example, when providing sensor data based on signals received from sensor 103, controller 109 may provide an indication of a particular set of physical pins of controller 109 to which sensor 103 is connected.

In some embodiments, controller 109 and/or communication interface 111 may include one or more digital-to-analog converters ("DACs"), which convert digital signals to analog signals. For example, controller 109 may receive digital signals from communication interface 111, such as instructions to control A/V devices 105, motors 107, and/or other devices or systems. Controller 109 may convert the digital signals to analog signals and output the analog signals to A/V devices 105, motors 107, etc. via one or more pins or other suitable physical interfaces of controller 109.

Communication interface 111 may include higher level messaging functionality, such as a message "broker" that may generate network layer messages (and/or other suitable types of messages and/or at some other layer) based on analog and/or digital signals received from one or more controllers 109. For example, communication interface 111 may include a Message Queuing Telemetry Transport ("MQTT") broker (e.g., where controllers 109 may include or implement MQTT client functionality). In some embodiments, communication interface 111 may communicate with external devices, systems, networks, etc. using WebSockets, Transmission Control Protocol ("TCP") messages, Internet Protocol ("IP") messages, and/or other suitable types of messages.

For example, communication interface 111 may communicate with network 115, which may be a RAN of a wireless network, via wireless communication interface 113. Wireless communication interface 113 may include, for example, wireless communication circuitry and/or logic, such as one or more wireless transceivers, radios, antennas, or the like. For example, wireless communication interface 113 may operate according to one or more licensed frequency bands or radio access technologies ("RATs"), such as a Fifth Generation ("5G") RAT. Similarly, network 115 may implement a 5G RAT, such that wireless communication interface 113 may register, attach, connect, etc. to network 115 using a suitable (e.g., the same) RAT implemented by wireless communication interface 113 and network 115.

Edge-controlled system 101 may accordingly communicate (e.g., send and/or receive data) with one or more devices or systems via network 115, such as an application server and/or other suitable device or system that performs operations such as processing of sensor data received from edge-controlled system 101 (e.g., as received from one or more sensors 103) and determines instructions for one or more devices connected to edge-controlled system 101 (e.g., A/V devices 105, motors 107, etc.). In some embodiments, edge-controlled system 101 may communicate with one or more devices or systems located at an "edge" of network 115, such as edge-based controller 117. Edge-based controller 117 may be deployed at an "edge" of network 115, in that edge-based controller 117 may communicate with edge-controlled system 101 without such communications traversing a core network associated with network 115, a backhaul network associated with network 115, etc. For example, in some embodiments, edge-based controller 117 may be implemented by, may include, and/or may be communicatively coupled to MEC 119, which may send and/or receive traffic via network 115 without the traffic needing to traverse a core network, backhaul network, etc.

In this manner, coupled with the low latency service provided by certain RATs (e.g., one or more 5G RATs or other suitable low latency RATs), edge-based controller 117 may provide powerful processing capabilities to edge-controlled system 101 in real time or near-real time, without needing to deploy such processing capabilities as physical components of edge-controlled system 101 or controllers 109. Further, as discussed below, edge-based controller 117 may aggregate data received from multiple controllers 109 and/or multiple edge-controlled systems 101, and may perform machine learning and/or other suitable techniques on such aggregated data in order to determine instructions to provide to edge-controlled system 101 (e.g., to control A/V devices 105, motors 107, etc.). Further still, as discussed below, some embodiments may provide a dynamic diagnostic/management UI, via which physical components (e.g., controllers 109 and/or components thereof, such as input and/or output pins that are connected to sensors 103, A/V devices 105, motors 107, etc.) may be logically associated with groups or virtual devices. Such groups and/or virtual devices may be used to gather diagnostic data and/or generate control data for real-world systems that may be made up of individual components (e.g., made up of sensors 103, A/V devices 105, motors 107, etc.), such as vehicle braking systems, engine management systems, etc. Further, the diagnostic/management UI of some embodiments may present such information in a manner that can be more readily understood by a user than merely providing raw data values associated with controllers 109 and/or components thereof.

Figure 2:
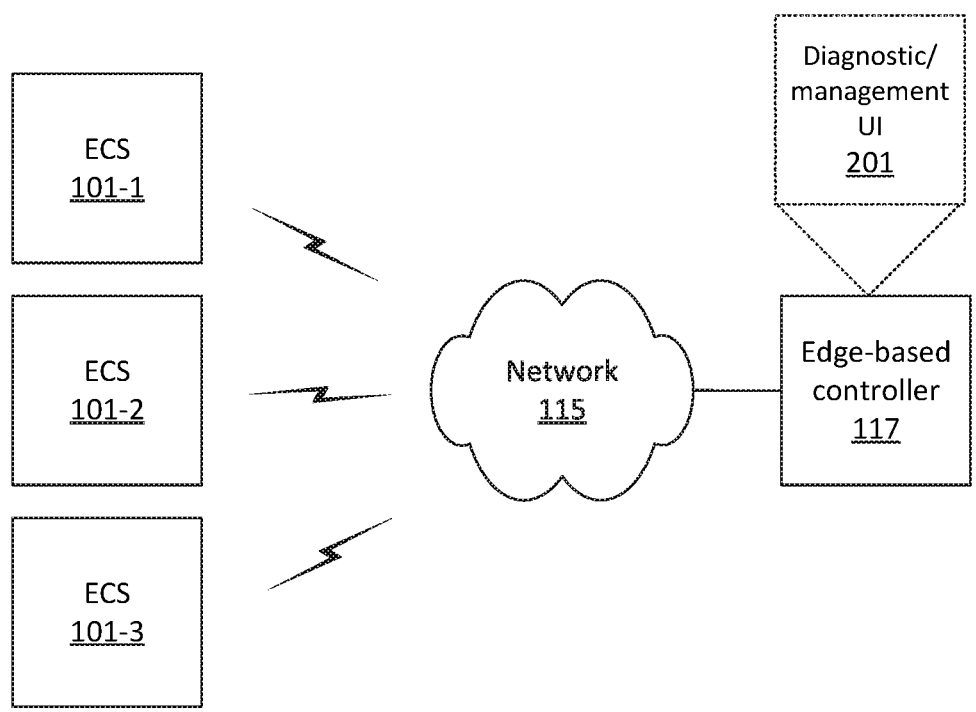
FIG. 2 illustrates an example presentation of a diagnostic/management user interface ("UI") associated with one or more edge-controlled systems of some embodiments.

As shown in FIG. 2, for example, multiple edge-controlled systems 101 (e.g., edge controlled-systems 101-1, 101-2, and 101-3) may communicate with edge-based controller 117 via network 115. Network 115 may provide diagnostic/management UI 201 based on information received from one or more of edge controlled-systems 101-1, 101-2, and 101-3, may aggregate and/or otherwise process the received information, and may provide instructions to edge controlled-systems 101-1, 101-2, and 101-3 and/or other devices based on the aggregated and/or processed data.

As one example, edge-based controller 117 may receive sensor data from one or more LIDAR sensors and accelerometers associated with edge-controlled system 101-1, and may perform machine learning and/or other suitable techniques to determine that a particular set of the received sensor data corresponds to a vehicle impact. For example, the LIDAR information may correspond to a relatively brief period of time (e.g., one second, three seconds, etc.), and may indicate the presence of an object detected by the LIDAR sensors. In some embodiments, the LIDAR information may indicate that the object is rapidly becoming closer in proximity to the LIDAR sensors over the period of time. The accelerometer information in this example may indicate a relatively large level of acceleration at a time that corresponds to the LIDAR sensors indicating that the object is relatively close to the LIDAR sensors.

In such a situation, edge-based controller 117 may determine that the information from the LIDAR sensors and the accelerometers indicates a collision or impact. As such, edge-based controller 117 may use machine learning and/or other suitable techniques to associate LIDAR sensor readings that are similar to the received LIDAR readings with an imminent impact. Edge-based controller 117 may further use machine learning and/or other suitable techniques to determine an appropriate set of instructions to provide to one or more of edge controlled-systems 101-1, 101-2, and 101-3 in situations where such LIDAR sensor readings are detected. For example, edge-based controller 117 may determine that a braking system should be actuated (e.g., to slow down a vehicle with which the LIDAR sensor readings are associated), that an A/V system should be actuated (e.g., to alert an occupant or operator of the vehicle of an impending impact), or the like. Additionally, or alternatively, edge-based controller 117 may receive (e.g., via diagnostic/management UI 201) instructions indicating how to respond to a given set of input data. For example, an operator, administrator, etc. associated with diagnostic/management UI 201 may specify that a braking system should be actuated when the above-mentioned example LIDAR readings are detected.

Figure 3:
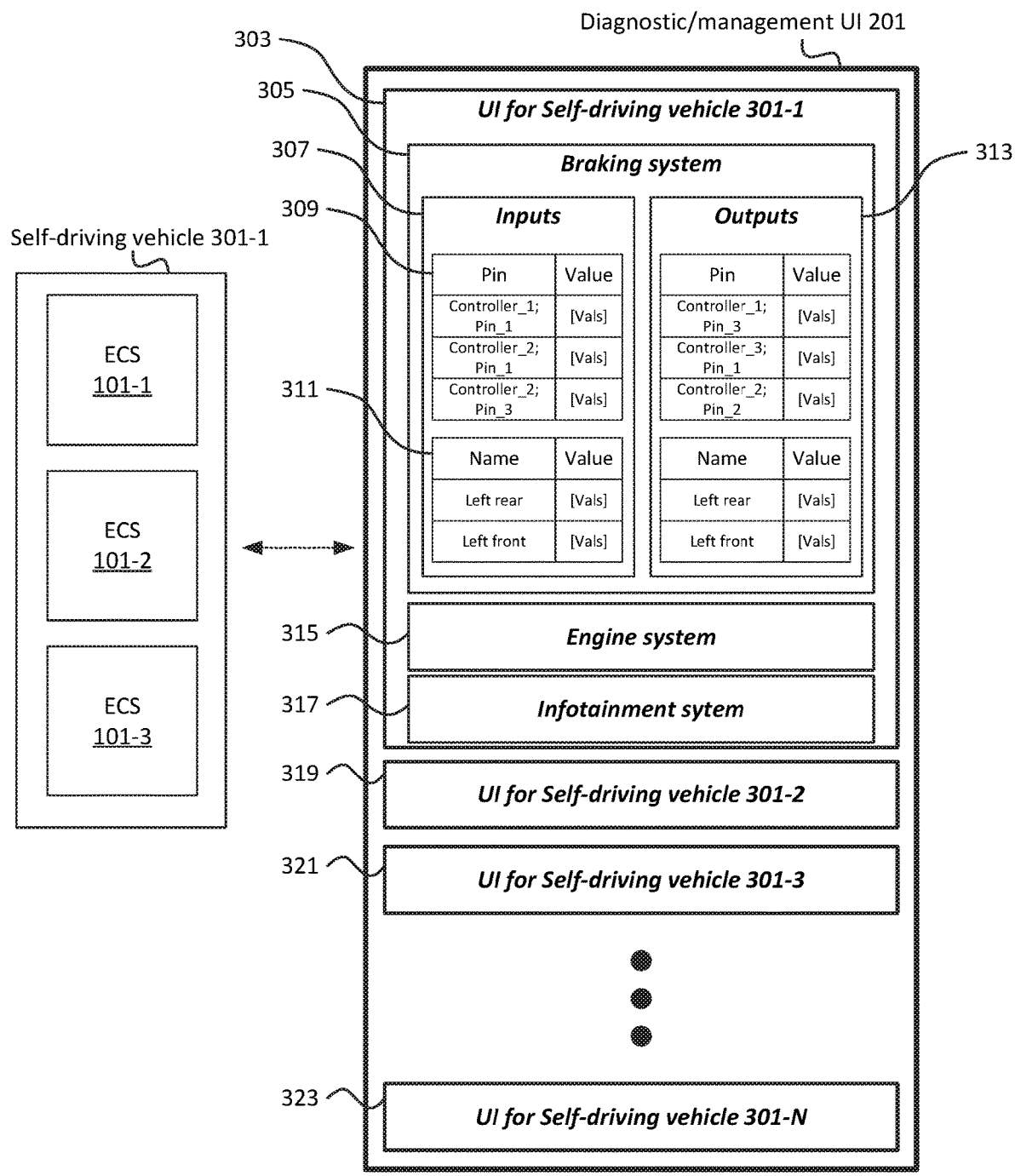
FIG. 3 illustrates an example of a diagnostic/management UI associated with a set of edge-controlled systems, in accordance with some embodiments.

FIG. 3 illustrates an example diagnostic/management UI 201 associated with a set of edge-controlled systems 101 of one or more self-driving vehicles 301, in accordance with some embodiments. Example diagnostic/management UI 201 is described here as including a set of display areas 303-323. In practice, diagnostic/management UI 201 may include additional, fewer, different, and/or differently arranged display areas and/or other graphical elements. For the sake of brevity, diagnostic/management UI 201 is described herein in the context of a graphical UI ("GUI"). In some embodiments, diagnostic/management UI 201 may include interface elements in addition to, or in lieu of, graphical elements, such as audible interface elements (e.g., voice to text, text to voice, audible alerts, etc.), haptic interface elements (e.g., vibrations), and/or other suitable types of interface elements.

As shown, for example, a particular self-driving vehicle 301-1 may include a set of edge-controlled systems 101-1, 101-2, and 101-3. As noted above, edge-controlled systems 101 may each include one or more physical devices, such as controllers 109, which include physical interfaces (e.g., pins) to sensors 103, A/V devices 105, motors 107, and/or other types of devices. Diagnostic/management UI 201 may include representations of logical devices, systems, subsystems, etc. based on the physical devices (e.g., controllers 109) of edge-controlled systems 101, and/or of components thereof (e.g., individual pins of controllers 109).

For example, diagnostic/management UI 201 may include display area 303, which is associated with a particular self-driving vehicle 301 (i.e., self-driving vehicle 301-1, in this example). Display area 303 may include multiple systems and/or subsystems, such as a braking system, an engine system, an infotainment system, etc. As discussed below with respect to FIG. 4, diagnostic/management UI 201 may be used to define such systems, such as associating individual edge-controlled systems 101 or components thereof (e.g., controllers 109 and/or pins of controllers 109) with these systems. In this manner, the defined systems may be associated with particular components of controllers 109, and may correspond to physical, real-world systems. For example, the logically defined "braking system" of self-driving vehicle 301-1 (e.g., as represented by display area 305) may be associated with particular controllers 109 that are connected to physical braking devices or systems of self-driving vehicle 301-1.

For example, display area 307 may represent input data associated with the braking system, such as data from anti-lock brake system ("ABS") sensors, wheel speed sensors, and/or other sensors or devices associated with the braking system of self-driving vehicle 301-1. For example, display area 307 may include display area 309, which may include input data (e.g., sensor data) received via individual pins of individual controllers 109 associated with edge-controlled systems 101 of self-driving vehicle 301-1. For example, display area 309 may provide values or other input data received via a first pin of a first controller 109 (e.g., denoted as "Controller_1; Pin_1"), via a first pin of a second controller 109 (e.g., denoted as "Controller_2; Pin_1"), and via a second pin of the second controller 109 (e.g., denoted as "Controller_2; Pin_2").

In some embodiments, display area 307 may additionally, or alternatively, include display area 311, which may include aggregated data from one or more controllers 109 or components thereof. For example, a "left rear" portion of the braking system may be associated with a set of input data received from multiple sensors or controllers 109, and display area 311 may present values based on an aggregation, categorization, classification, etc. of such input data. For example, the values included in display area 311 for the "left rear" braking system may include categories, classifications, or other aggregated or derived values such as "operational," "malfunctioning," "30% worn," "50% rotor thickness remaining," etc.

Similarly, display area 313 may represent output data associated with individual controllers 109 (or components thereof) of self-driving vehicle 301-1, and/or aggregated or derived values thereof. For example, the output data may represent instructions provided to self-driving vehicle 301-1, such as voltages applied via individual controllers 109 or individual pins of controllers 109, and/or other signals outputted via such controllers 109 or pins.

In some embodiments, display area 307 and display area 313 may indicate, respectively, input and output models. For example, display area 307 may represent a set of input data (e.g., based on historical information received from one or more self-driving vehicles 301 and/or other sources), and a set of output data to provide in situations where input data matching the model (e.g., where "match" indicates a level of similarity exceeding a threshold, based on a suitable similarity determination technique). As noted above, such correlations of input models to output models may be determined using machine learning and/or other suitable techniques, and/or may be manually defined via diagnostic/management UI 201.

As further shown, display area 303 may include display areas 315 and 317 associated with other systems of self-driving vehicle 301-1, such as an engine system and an infotainment system, respectively. Display areas 315 and 317 may include similar display areas and/or functionality as that described above with respect to display area 305. For example, display areas 315 and 317 may display input and/or output values or models associated with respective systems of self-driving vehicle 301-1, and/or may provide elements via which certain models (e.g., output models) may be associated with other models (e.g., input models). In some embodiments, an output model of one system (e.g., an infotainment system) may be associated with an input model that includes inputs from one or more other systems (e.g., a braking system). For example, an input model for the braking system may indicate that a particular brake has malfunctioned or is worn beyond a threshold level of wear, and a corresponding output model may be include displaying an alert via a display screen of an infotainment system of self-driving vehicle 301-1. In some embodiments, output models may include information to be output to one or more devices or systems external to self-driving vehicle 301-1, such as a Short Message Service ("SMS") message or other suitable type of message to a mobile telephone of a user who is associated with self-driving vehicle 301-1.

As further shown, diagnostic/management UI 201 may include display areas 319-323, which may include similar information and/or elements as discussed above with respect to display area 303. For example, display area 319 may be associated with self-driving vehicle 301-2, display area 321 may be associated with self-driving vehicle 301-3, and display area 323 may be associated with self-driving vehicle 301-N. In this manner, input data and/or models as well as output data and/or models for numerous devices, systems, or the like may be readily accessed and controlled via diagnostic/management UI 201.

Figure 4:
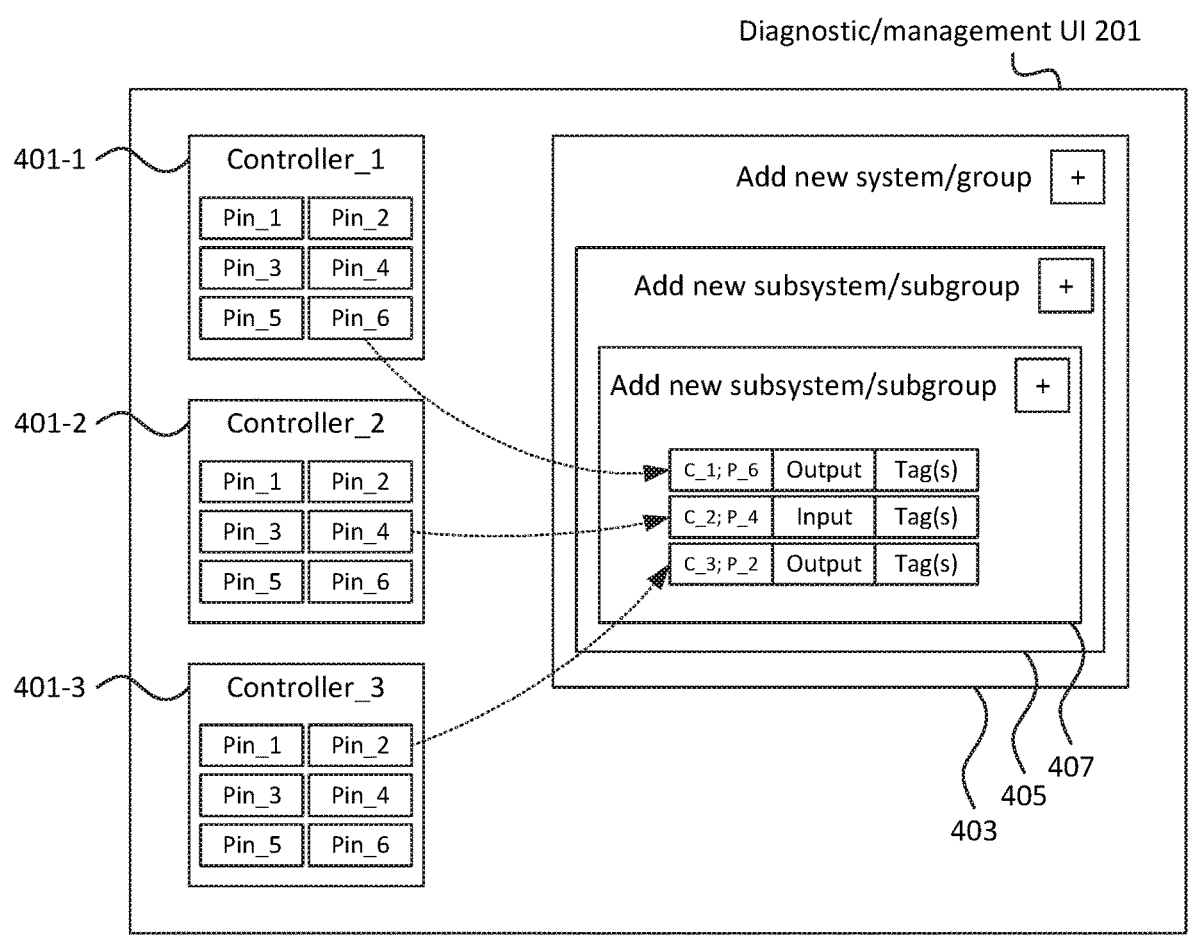
FIG. 4 illustrates an example drag-and-drop association of components of physical controllers with one or more logical devices or systems, in accordance with some embodiments.

FIG. 4 illustrates an example association of components of physical controllers (e.g., controllers 109), and/or components thereof (e.g., physical pins or other types of physical interfaces) with logical devices or systems, in accordance with some embodiments. As noted above, for example, logical components may correspond to one or more real-world devices or systems, combinations of real-world devices or systems, or portions thereof. For example, a logical "braking system" (e.g., as discussed above with respect to FIG. 3 and as defined using diagnostic/management UI 201) may correspond to sensors, motors, and/or other types of physical devices associated with brakes or related systems in a particular self-driving vehicle 301. In some embodiments, a logical braking system may be defined as having one or more sub-systems, such as a front braking system and a rear braking system. In some embodiments, any level of sub-systems may be defined in a hierarchical, such that a particular system may include one or more sub-systems, which themselves may in turn include one or more sub-systems, and so on.

As shown in FIG. 4, for example, graphical elements 401-1, 401-2, and 401-3 may each represent a particular physical controller, such as a particular controller 109 associated with a particular edge-controlled system 101 of some embodiments. In some embodiments, such controllers 109 may register with edge-based controller 117 and/or some other device or system using MQTT over Web Socket and/or another suitable messaging protocol.

In some embodiments, graphical elements 401 may include graphical elements that are each associated with a particular pin or other type of physical interface of a corresponding controller 109. For example, as shown, graphical element 401-1 may be associated with a first controller 109 (shown in FIG. 4 as "Controller_1"), which may be associated with six pins ("Pin_1" through "Pin_6"). Similarly, graphical element 401-2 may be associated with a second controller 109 with six pins, and graphical element 401-3 may be associated with a third controller 109 with six pins. In practice, controllers 109 may include additional or fewer pins. In some embodiments, some controllers 109 may include different quantities of pins than other controllers.

As further shown, diagnostic/management UI 201 may include options to add new systems, groups, or the like. For example, an operator may use such options to add a system that corresponds to a particular self-driving vehicle 301 (e.g., where selection of the option causes display area 403 to be generated), add a sub-system that corresponds to a braking system of self-driving vehicle 301 (e.g., where selection of the option causes display area 405 to be generated), add a sub-system of the braking system that corresponds to a particular side or wheel of the braking system (e.g., where selection of the option causes display area 407 to be generated), and so on.

Graphical element 401 may also include an option to add a particular controller 109 or particular set of pins of controller 109 to a given system or sub-system. For example, graphical element 401-1 may be dragged and dropped to display area 407 to indicate that graphical element 401-1 is associated with the sub-system associated with display area 407. Additionally, or alternatively, as shown in FIG. 4, particular pins of the controller 109 represented by graphical element 401-1 may be added (e.g., dragged and dropped, or some other suitable type of operation) to display area 407. diagnostic/management UI 201 may also provide an option to specify whether a given pin is associated with input data (e.g., whether data is received via the pin) or output data (e.g., whether instructions or other data are output from the pin). Additionally, or alternatively, edge-based controller 117 may receive information indicating whether a particular pin is associated with input data or output data during a registration or configuration process. For example, edge-based controller 117 may receive such information from controller 109 and/or some other source during the registration or configuration process. In some embodiments, diagnostic/management UI 201 may include an option to associate one or more tags, categories, flags, or the like with a particular pin or set of pins.

For example, as shown in FIG. 4, Pin_6 of Controller_1 (denoted in the figure as "C_1; P_6") may be indicated as an "output" pin, and further may include one or more tags. The tags may be used by edge-based controller 117 and/or one or more other devices or systems to analyze and/or otherwise process the data. For example, the tag may indicate a name or type of sensor connected to the pin, debug codes, and/or other types of information.

Figure 5:
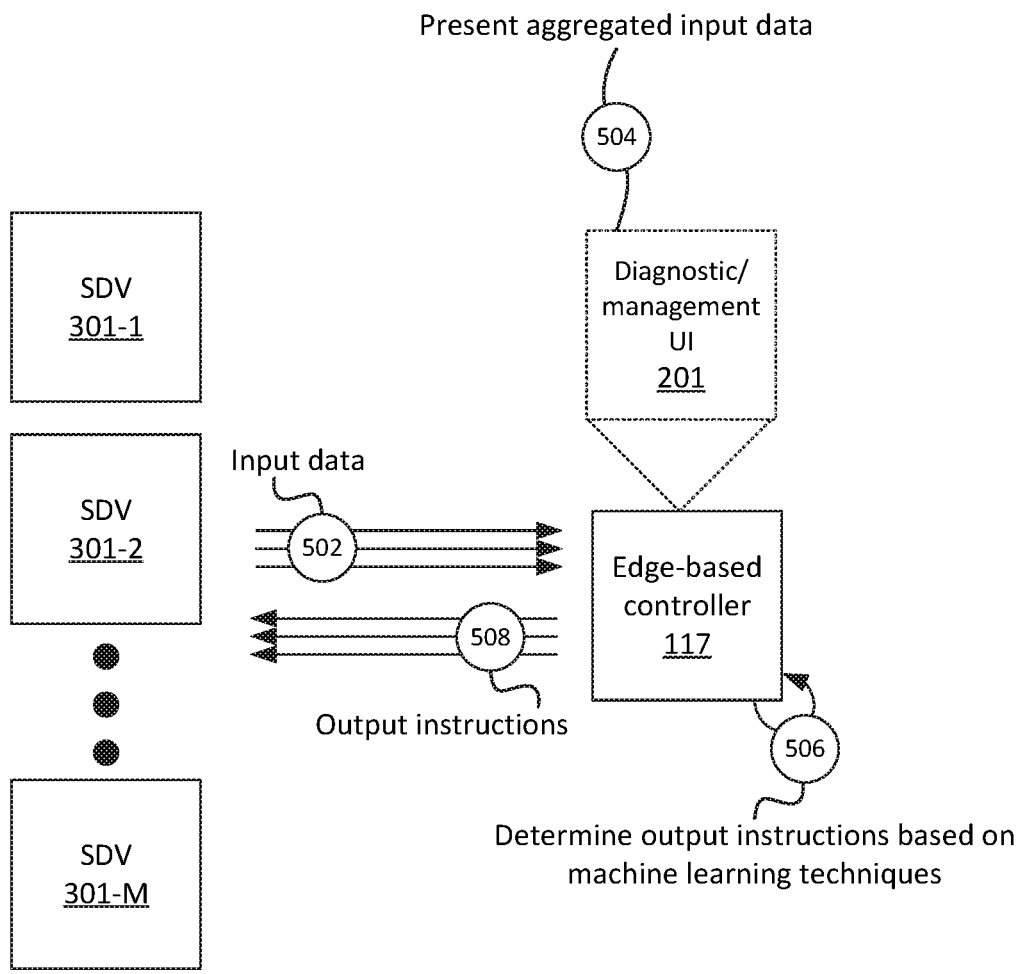
FIG. 5 illustrates an example of edge-based processing using machine learning techniques based on input data received from one or more devices.

FIG. 5 illustrates an example of edge-based processing using machine learning techniques based on input data received from one or more self-driving vehicles 301, in accordance with some embodiments. While examples herein are discussed in terms of self-driving vehicles, in practice, similar concepts may apply to other types of devices or systems that receive input data (e.g., sensor data), where the input data affects operation of controllable elements of the devices or systems (e.g., where such controllable elements react differently to different sets of input data).

As shown, for example, self-driving vehicles 301-1, 301-2, and 301-M may provide (at 502) input data to edge-based controller 117 (e.g., via a low latency wireless network, such as a 5G RAN). In some embodiments, self-driving vehicles may communicate with multiple edge-based controllers 117 (e.g., via different RANs, and/or via different instances of a RAN), which may communicate with each other in order to perform operations (e.g., machine learning and/or other suitable operations) based on information received from geographically diverse self-driving vehicles 301.

In some embodiments, edge-based controller 117 may present (at 504) aggregated input data, as received from one or more self-driving vehicles 301. For example, edge-based controller 117 may present such input data via diagnostic/management UI 201. In some embodiments, edge-based controller 117 may implement an application programming interface ("API"), web portal, or other suitable communication pathway via which diagnostic/management UI 201 may be provided to a workstation, tablet computer, and/or other suitable device or system for presentation.

Edge-based controller 117 may further determine (at 506) output instructions based on machine learning techniques or other suitable techniques. For example, as discussed above, edge-based controller 117 may generate, receive, and/or refine one or more models based on a set of input data received over time. For example, edge-based controller 117 may receive a set of accelerometer data provided by accelerometers to controllers 109 of edge-controlled systems 101 installed in self-driving vehicles 301, and may generate models that correlate accelerometer readings to events such as sudden acceleration, impact, hard braking, and/or other types of events. In some embodiments, edge-based controller 117 may utilize supervised machine learning (e.g., based on active feedback from users), unsupervised machine learning (e.g., not necessarily based on active feedback from users), and/or other types of machine learning techniques to identify trends, clusters, and/or other correlations various types of input data to events or other classifiers.

Edge-based controller 117 may, for example, determine output instructions for a given set of input data based on one or more input models associated with the input data, and one or more output models associated with the input models. For example, edge-based controller 117 may have generated, over time, an input model based on accelerometer data that is associated with an impact. Edge-based controller 117 may accordingly determine that when input data is received that matches, or substantially matches, the input data associated with the model, that a set of output instructions should be provided to a braking system of an associated self-driving vehicle 301, to actuate the brakes before a potential collision occurs. Additionally, or alternatively, edge-based controller 117 may determine that an alert should be provided to an infotainment system of self-driving vehicle 301. In some embodiments, edge-based controller 117 may determine that an alert should be provided to an infotainment system (e.g., to one or more controllers 109 and/or edge-controlled systems 101) of one or more vehicles in the vicinity of self-driving vehicle 301 (e.g., where edge-based controller 117 may receive location data associated with such vehicles, and may determine based on the location data that the vehicles are within a threshold proximity of edge-based controller 117).

Edge-based controller 117 may proceed to output (at 508) instructions to self-driving vehicles 301 based on the input data received from respective self-driving vehicles 301. As noted above, the instructions (output at 508) to a particular self-driving vehicle 301 may be based on a model or other computations based on input data received from one or more other self-driving vehicles 301 and/or other devices or systems.

Figure 6:
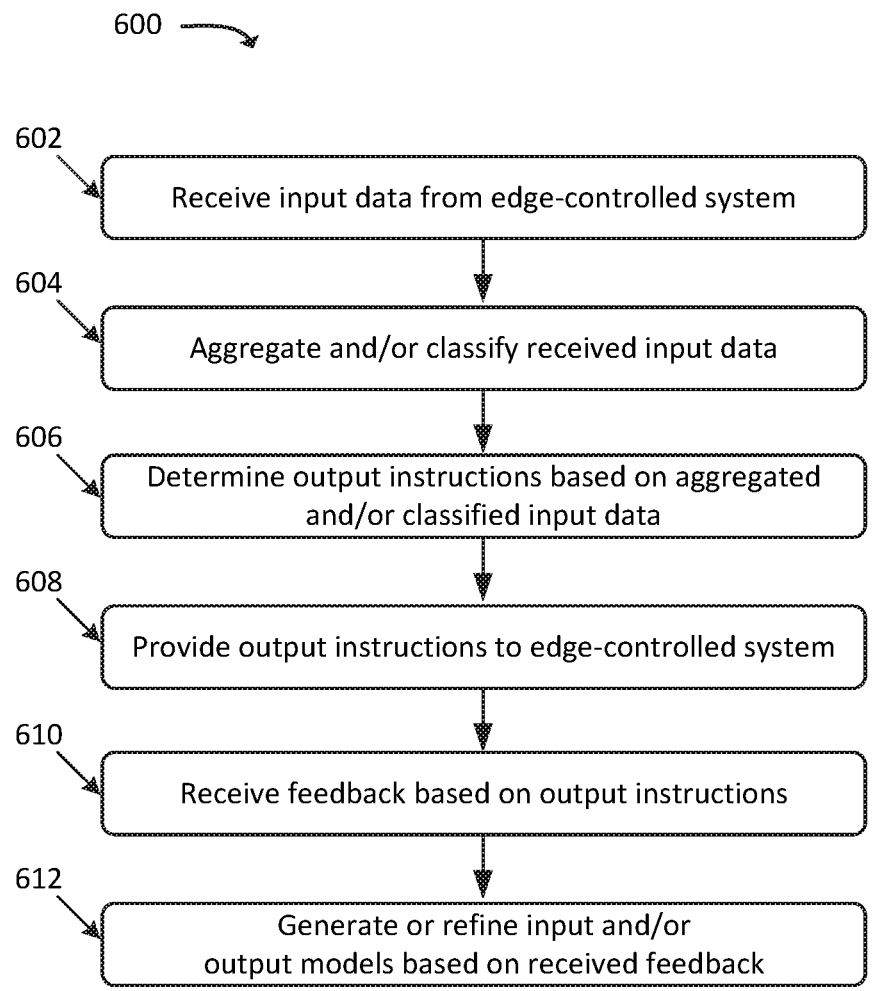
FIG. 6 illustrates an example process for performing edge-based processing and generation of instructions for controllers based on input data received from the controllers, in accordance with some embodiments.

FIG. 6 illustrates an example process 600 for performing edge-based processing and generation of instructions for controllers based on input data received from the controllers. In some embodiments, some or all of process 600 may be performed by edge-based controller 117. In some embodiments, one or more other devices may perform some or all of process 600 (e.g., in concert with, and/or in lieu of, edge-based controller 117).

As shown, process 600 may include receiving (at 602) input data from edge-controlled system 101. For example, edge-based controller 117 may receive input data from one or more edge-controlled systems 101. As discussed above, edge-controlled system 101 may include controllers 109 and/or other types of devices, which may receive input data from one or more input devices (e.g., sensors). In some embodiments, edge-controlled system 101 and/or controllers 109 may include one or more ADCs, which may convert the signals to digital signals. Further, as discussed above, edge-controlled system 101 may include communication interface 111, which may generate messages (e.g., MQTT messages) that include or are otherwise based on the digital signals. Further, edge-controlled system 101 may include wireless communication interface 113, via which edge-controlled system 101 may communicate wirelessly with edge-based controller 117 and/or other devices and/or systems (e.g., may wirelessly provide the messages generated by communication interface 111 via a low latency network, such as a 5G RAN).

Process 600 may further include aggregating and/or classifying (at 604) the received input data. For example, edge-based controller 117 may analyze received input data over time to generate one or more models based on the received input data. In some embodiments, when aggregating the data, generating the models, etc., edge-based controller 117 may perform such aggregating and/or generating based on systems or sub-systems with which edge-controlled system 101 or portions thereof (e.g., individual controllers 109, and/or pins of such controllers 109) are associated. For example, as discussed above, edge-based controller 117 may determine that a first set of input data (e.g., from a first set of controllers 109 or pins) is associated with a braking system, and that a first set of input data (e.g., from a second set of controllers 109 or pins) is associated with an engine system, and so on. Such associations may have been determined based on machine learning (e.g., based on an analysis of input data and a determination that such input data is associated with particular types of systems) and/or based on inputs received via diagnostic/management UI 201.

Edge-based controller 117 may also generate, receive, maintain, etc. a set of models, as discussed above, that correlates input data to events, categories, classifications, etc. For example, one such set of input models may be associated with input data from a braking system and/or an impact detection system, and may indicate attributes of the braking system and/or impact detection system during a period of time (e.g., one second, three seconds, etc.) leading up to a detected impact. As another example, a set of input models may be associated with a steering system, and may indicate attributes of the steering system during a period of time leading up to a detected impact. Edge-based controller 117 may compare the received (at 602) input data (and/or one or more models generated based on the received input data) to the input models maintained by edge-based controller 117, and may determine one or more events, classifications, etc. of the received input data based on the comparison.

Process 600 may additionally include determining (at 606) output instructions based on the aggregated and/or classified input data. For example, edge-based controller 117 may use machine learning and/or other suitable techniques to determine one or more output models or other instructions based on the determined input model(s) associated with the received input data. For example, a particular output model associated with an input model indicating an imminent collision may include instructions to actuate a braking system (e.g., cause a vehicle to slow down or stop), actuate a steering system (e.g., cause a vehicle to safely swerve out of the way of a detected obstruction or other object), etc. The association of particular output models to input models may be performed using machine learning or other suitable automated or semi-automated techniques, and/or may be manually provided (e.g., via diagnostic/management UI 201).

Process 600 may also include providing (at 608) the output instructions to edge-controlled system 101. For example, edge-based controller 117 may provide the determined output instructions to edge-controlled system 101 (e.g., via network 115). As discussed above, edge-controlled system 101 may further include communication interface 111, which may decapsulate, transcode, perform digital-to-analog conversion, and/or perform other suitable operations to provide the instructions to one or more controllers 109. Controllers 109 may proceed to provide the instructions to connected devices (e.g., sensors 103, A/V devices 105, motors 107, and/or other suitable types of devices) via analog signals or other types of electrical signals. The electrical signals may include varying voltages, pulse-width modulation ("PWM"), and/or other suitable forms of providing instructions by way of analog signals or other types of electrical signals.

As edge-based controller 117 may have considerably higher computing and/or processing capability than edge-controlled system 101 or its components (e.g., controllers 109), edge-based controller 117 may be able to perform more complex operations in a significantly faster time than implementations in which edge-controlled system 101 and/or controller 109 were to perform the determination of how to respond to particular sets of input data. For example, edge-based controller 117 may be implemented by relatively large data centers, cloud computing systems, etc., which may not have the physical size limitations that may be present for edge-controlled system 101 and/or controller 109, which may be physically deployed in a system, device, machine, etc., such as a self-driving vehicle, a drone, or some other type of system, device, or machine. Further, as the communication between edge-controlled system 101 and edge-based controller 117 via a wireless network (e.g., a 5G RAN) may be relatively low latency (e.g., within five milliseconds, within ten milliseconds, etc.), the end result may resemble an implementation in which powerful onboard processing hardware and logic is deployed with edge-controlled system 101 and/or controller 109.

Process 600 may further include receiving (at 610) feedback based on the output instructions. For example, edge-based controller 117 may continue to receive input data from edge-controlled system 101. Assume, for example, that edge-based controller 117 determined (at 606) that the input data (classified at 604) is associated with an imminent collision, and that edge-based controller 117 provided (at 608) output instructions to actuate a braking system and a steering system. Input data received within the next three seconds, five seconds, etc. may be considered "feedback" data associated with the output instructions (i.e., the instructions to actuate the braking and steering systems). For example, the feedback data may indicate whether the output instructions yielded a desired outcome, such as the avoidance of an impact.

Process 600 may additionally include generating and/or refining (at 612) input and/or output models based on the received feedback. Continuing with the above example, if no impact is detected within the brief time period after the imminent impact was detected and the instructions to avoid the impact were provided, edge-based controller 117 may determine that the output instructions provided the desired outcome, and may strengthen a correlation, affinity, etc. between one or more output models associated with the output instructions (e.g., instructions to brake and/or steer a vehicle). Thus, in future situations where similar or identical input models are detected, edge-based controller 117 may be more likely to select the particular output model determined (at 606) as being associated with the particular input model.

If, on the other hand, an impact is detected even after the output instructions are provided (at 608), then edge-based controller 117 may weaken a correlation, affinity, etc. between one or more output models associated with the output instructions (e.g., instructions to brake and/or steer a vehicle). Thus, in future situations where similar or identical input models are detected, edge-based controller 117 may be less likely to select the particular output model determined (at 606) as being associated with the particular input model, and/or may avoid selecting the particular output model entirely in similar situations (e.g., given the same or similar input model).

Figure 7:
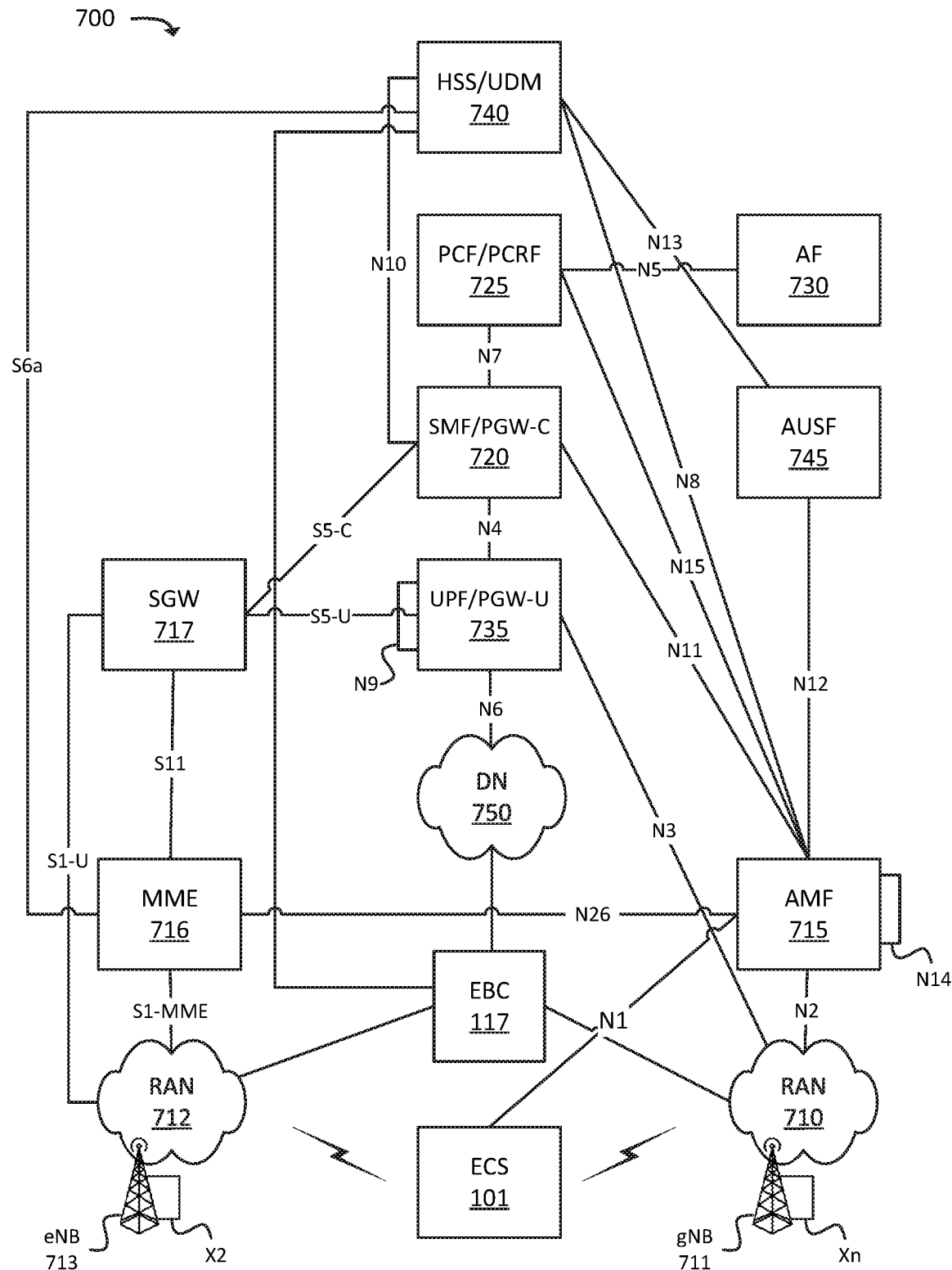
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include edge-controlled system 101, edge-based controller 117, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MIME") 716, Serving Gateway ("SGW") 717, Session Management Function ("SMF")/Packet Data Network ("PDN") Gateway ("PGW")—Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

The example shown in FIG. 7 illustrates one example of each network component or function (e.g., one instance of SMF/PGW-C 720, PCF/PCRF 725, UPF/PGW-U 735, HSS/UDM 740, and/or 745. In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

Edge-controlled system 101 may include a computation and communication device, such as a wireless mobile communication device that is capable of communicating with RAN 710, RAN 712, and/or DN 750. For example, as noted above, edge-controlled system 101 may include wireless communication interface 113, via which edge-controlled system 101 may send traffic to and/or receive traffic from one or more MECs 119 and/or DN 750 via RAN 710, RAN 712, and/or UPF/PGW-U 735. Edge-controlled system 101 may also include one or more controllers 109 or other suitable types of devices, control boards, SoC devices, etc. In some embodiments, controller 109 may include, may be implemented by, and/or may be communicatively coupled with an Arduino® device or some other suitable type of device.

Environment 700 may include other types of devices that communicate via RANs 710 and/or 712. For example, environment 700 may include one or more User Equipment ("UEs"), which may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an IoT device, a Mobile-to-Mobile ("M2M") device, or another type of mobile computation and communication device. UEs may send traffic to and/or receive traffic (e.g., user plane traffic) from DN 750 via RAN 710, RAN 712, and/or UPF/PGW-U 735. In some embodiments, a UE may be communicatively coupled with one or more edge-controlled systems 101, and may serve as a communication interface (e.g., may implement some or all of the functionality of communication interface 111) between edge-controlled system 101 and RAN 710 and/or RAN 712.

RAN 710 may be, or may include, a 5G RAN that includes one or more base stations (e.g., one or more gNBs 711), via which edge-controlled system 101 may communicate with one or more other elements of environment 700. edge-controlled system 101 may communicate with RAN 710 via an air interface (e.g., as provided by gNB 711). For instance, RAN 710 may receive traffic (e.g., voice call traffic, data traffic, messaging traffic, signaling traffic, etc.) from edge-controlled system 101 via the air interface, and may communicate the traffic to UPF/PGW-U 735, and/or one or more other devices or networks. Similarly, RAN 710 may receive traffic intended for edge-controlled system 101 (e.g., from UPF/PGW-U 735, AMF 715, and/or one or more other devices or networks) and may communicate the traffic to edge-controlled system 101 via the air interface.

RAN 712 may be, or may include, a LTE RAN that includes one or more base stations (e.g., one or more eNBs 713), via which edge-controlled system 101 may communicate with one or more other elements of environment 700. edge-controlled system 101 may communicate with RAN 712 via an air interface (e.g., as provided by eNB 713). For instance, RAN 710 may receive traffic (e.g., voice call traffic, data traffic, messaging traffic, signaling traffic, etc.) from edge-controlled system 101 via the air interface, and may communicate the traffic to UPF/PGW-U 735, and/or one or more other devices or networks. Similarly, RAN 710 may receive traffic intended for edge-controlled system 101 (e.g., from UPF/PGW-U 735, SGW 717, and/or one or more other devices or networks) and may communicate the traffic to edge-controlled system 101 via the air interface.

AMF 715 may include one or more devices, systems, Virtualized Network Functions ("VNFs"), etc., that perform operations to register edge-controlled system 101 and/or one or more UEs with the 5G network, to establish bearer channels associated with a session with edge-controlled system 101 and/or one or more UEs, to hand off edge-controlled system 101 and/or one or more UEs from the 5G network to another network, to hand off edge-controlled system 101 and/or one or more UEs from the other network to the 5G network, manage mobility of edge-controlled system 101 and/or one or more UEs between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register edge-controlled system 101 and/or one or more UEs with the EPC, to establish bearer channels associated with a session with edge-controlled system 101 and/or one or more UEs, to hand off edge-controlled system 101 and/or one or more UEs from the EPC to another network, to hand off edge-controlled system 101 and/or one or more UEs from another network to the EPC, manage mobility of edge-controlled system 101 and/or one or more UEs between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of edge-controlled system 101 and/or one or more UEs. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for edge-controlled system 101 and/or one or more UEs, from DN 750, and may forward the user plane data toward edge-controlled system 101 and/or one or more UEs (e.g., via RAN 710, SMF/PGW-C 720, and/or one or more other devices). In some embodiments, multiple UPFs 735 may be deployed (e.g., in different geographical locations), and the delivery of content to edge-controlled system 101 and/or one or more UEs may be coordinated via the N9 interface (e.g., as denoted in FIG. 7 by the line marked "N9" originating and terminating at UPF/PGW-U 735). Similarly, UPF/PGW-U 735 may receive traffic from edge-controlled system 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with edge-controlled system 101 and/or one or more UEs.

DN 750 may include one or more wired and/or wireless networks. For example, DN 750 may include an Internet Protocol ("IP")-based PDN, a wide area network ("WAN") such as the Internet, a private enterprise network, and/or one or more other networks. Edge-controlled system 101 and/or one or more UEs may communicate, through DN 750, with data servers, other edge-controlled systems 101 and/or one or more UEs, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which edge-controlled system 101 and/or one or more UEs may communicate.

Edge-based controller 117 may include one or more devices, systems, VNFs, or the like, that perform one or more operations described above (e.g., provide instructions to one or more edge-controlled systems 101 based on input data received from edge-controlled systems 101, perform machine learning or other suitable techniques to generate and/or refine models, etc.). One or more instances of edge-based controller 117 may be implemented by components of RANs 710 and/or 712, such as by one or more MECs 119. In some embodiments, some or all of the functionality of edge-based controller 117 may be implemented by a device or system that is communicatively coupled to DN 750. In some embodiments, different instances of edge-based controller 117 (e.g., as implemented by MECs 119) may communicate with one another (e.g., via DN 750, via a X2 interface, via a Xn interface, or some other suitable communication pathway), in order to perform aggregation, analysis, etc. of input and/or output data associated with multiple geographically diverse instances of edge-based controller 117. In some embodiments, edge-based controller 117 may receive user or subscriber information from HSS/UDM 740, which edge-based controller 117 may use in determining output instructions for particular edge-controlled systems 101.

Figure 8:
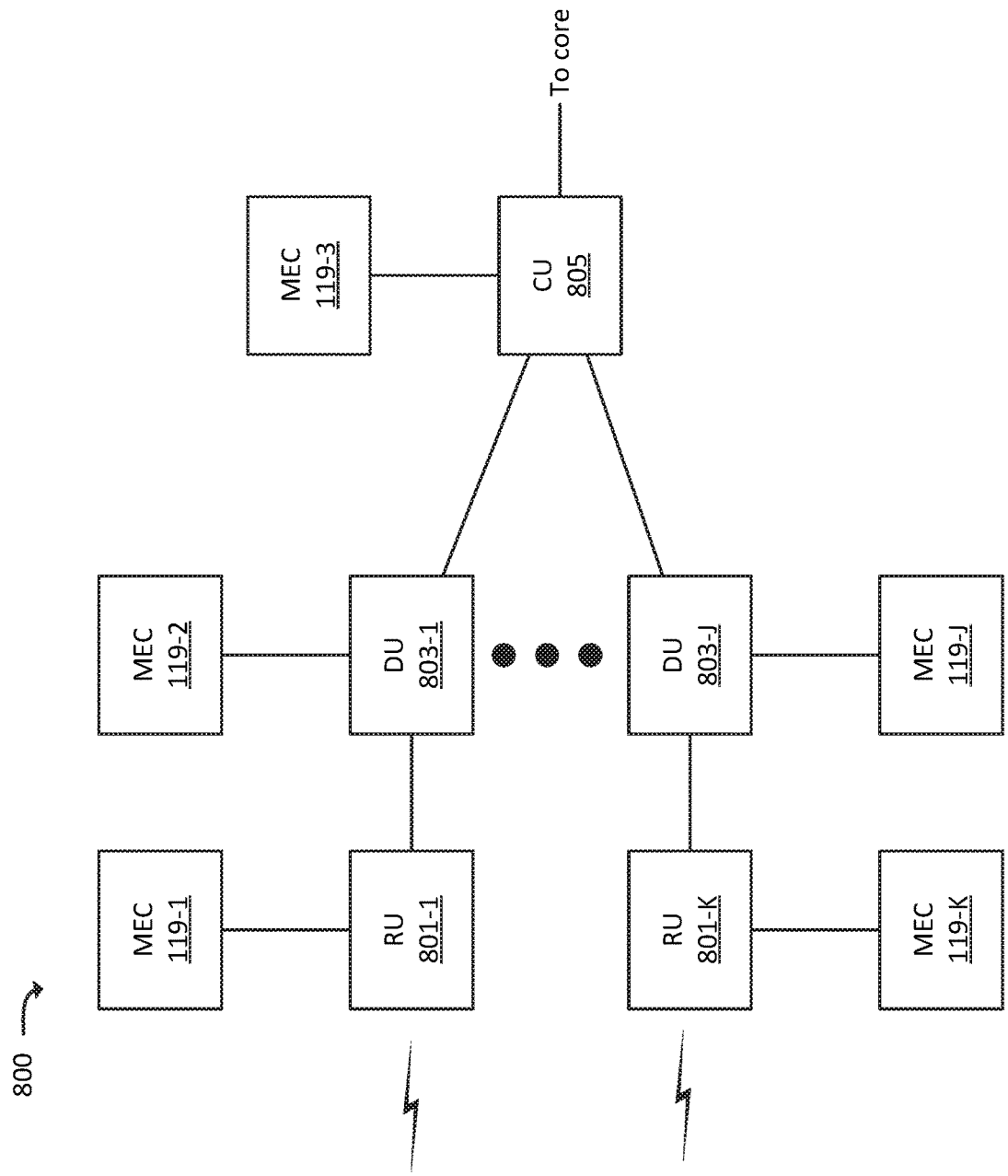
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-J (referred to individually as "DU 803," or collectively as "DUs 803"), and one or more Radio Units ("RUs") 801-1 through 801-K (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from edge-controlled systems 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular edge-controlled system 101, and may determine which DU(s) 803 should receive the downlink traffic. DU 803 may include one or more devices that transmit traffic between a core network (e.g., via CU 805) and edge-controlled system 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to edge-controlled system 101.

RU 801 may include hardware circuitry (e.g., one or more RF transceivers, antennas, radios, and/or other suitable hardware) to communicate wirelessly (e.g., via an RF interface) with one or more edge-controlled systems 101, one or more other DUs 803 (e.g., via RUs 801 associated with DUs 803), and/or any other suitable type of device. In the uplink direction, RU 801 may receive traffic from edge-controlled system 101 and/or another DU 803 via the RF interface and may provide the traffic to DU 803. In the downlink direction, RU 801 may receive traffic from DU 803, and may provide the traffic to edge-controlled system 101 and/or another DU 803.

RUs 801 may, in some embodiments, be communicatively coupled to one or more Multi-Access/Mobile Edge Computing ("MEC") devices, referred to sometimes herein simply as ("MECs") 119. For example, RU 801-1 may be communicatively coupled to MEC 119-1, RU 801-K may be communicatively coupled to MEC 119-K, DU 803-1 may be communicatively coupled to MEC 119-2, DU 803-J may be communicatively coupled to MEC 119-J, CU 805 may be communicatively coupled to MEC 119-3, and so on. MECs 119 may include hardware resources (e.g., configurable or provisionable hardware resources) that may be configured to provide services and/or otherwise process traffic to and/or from edge-controlled system 101, via a respective RU 801.

For example, RU 801-1 may route some traffic, from edge-controlled system 101, to MEC 119-1 instead of to a core network (e.g., via DU 803 and CU 805). MEC 119-1 may process the traffic, perform one or more computations based on the received traffic, and may provide traffic to edge-controlled system 101 via RU 801-1. In this manner, ultra-low latency services may be provided to edge-controlled system 101, as traffic does not need to traverse DU 803, CU 805, and an intervening backhaul network between DU network 800 and the core network. As noted above, MEC 119 may include, and/or may implement some or all of the functionality described above with respect to edge-controlled system 101.

Figure 9:
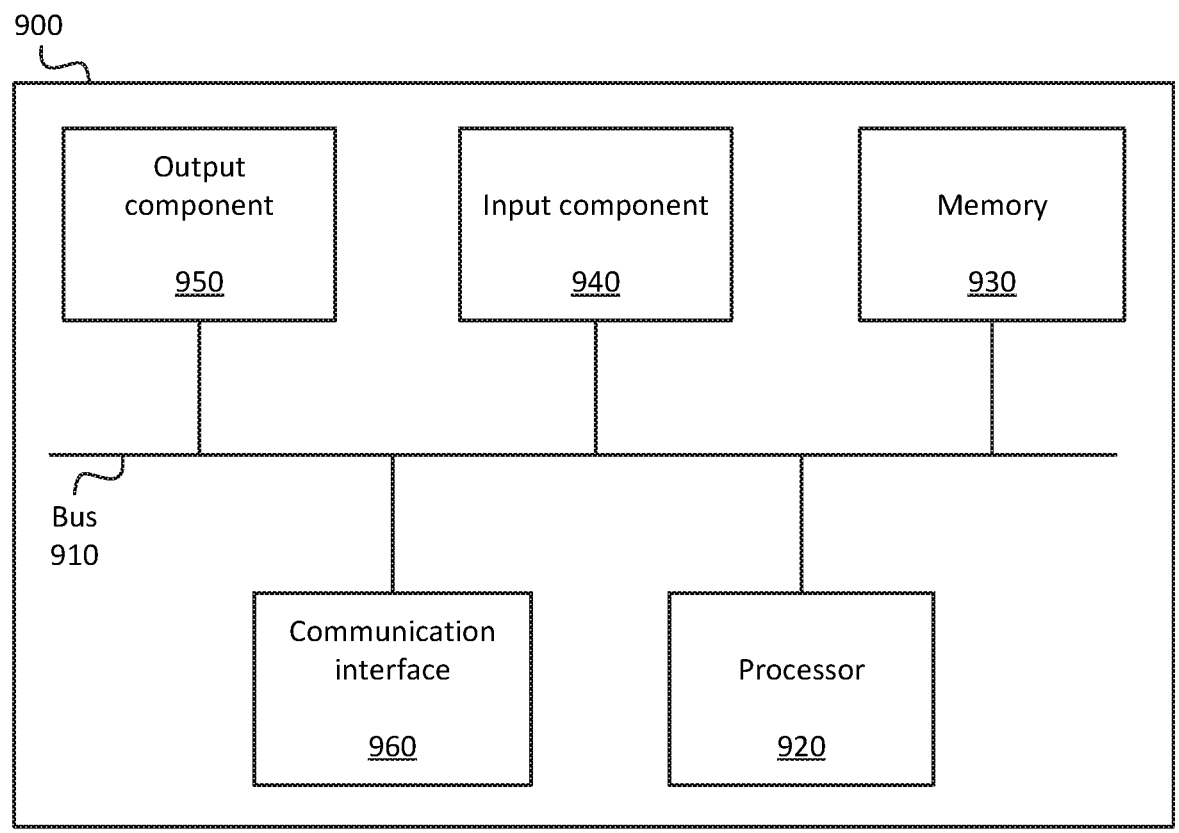
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain, by a Multi-Access/Mobile Edge Computing device ("MEC"), a plurality of input models that each include respective sensor data values;
maintain, by the MEC, a plurality of output models that each include one or more actions to perform;
maintain, by the MEC, information associating respective input models, of the plurality of input models, to respective output models of the plurality of output models;
receive, by the MEC, via one or more wireless networks, input data from one or more edge-controlled systems, wherein a particular edge-controlled system of the one or more edge-controlled system includes one or more controllers, wherein the received input data is based on sensor data collected by one or more sensors that are communicatively coupled to the one or more controllers;
compare, by the MEC, the input data to the plurality of input models that are each based on respective sensor data values;
select, by the MEC and based on the comparing, a particular input model from the plurality of input models;
identify, by the MEC and based on the information associating respective input models to respective output models, a particular output model associated with the particular input model, wherein the one or more actions associated with the particular output model include a plurality of output instructions to actuate one or more devices connected to the one or more controllers; and
provide, by the MEC, via the one or more wireless networks, the plurality of output instructions to the particular edge-controlled system, wherein the particular edge-controlled system generates a set of electrical signals based on the plurality of output instructions and provides the set of electrical signals to actuate the one or more devices connected to the one or more controllers.

2. The device of claim 1, wherein the one or more wireless networks include a radio access network ("RAN"), and wherein the input data is received by the MEC from a base station of the RAN without the input data traversing a core network that is communicatively coupled to the RAN.

3. The device of claim 1, wherein the one or more devices connected to the one or more edge-controlled systems include one or more motors, wherein actuating the one or more devices includes actuating the one or more motors.

4. The device of claim 1, wherein the plurality of output instructions include instructions to actuate one or more logical systems, wherein the particular edge-controlled system generates the set of electrical signals to actuate the one or more connected devices based on the instructions to actuate the one or more logical systems.

5. The device of claim 1, wherein the one or more processors are further configured to:
receive feedback data from the particular edge-controlled system after providing the output instructions to the particular edge-controlled system; and
modify the output model based on the feedback data.

6. The device of claim 1, wherein the one or more processors are further configured to:
receive feedback data from the particular edge-controlled system after providing the output instructions to the particular edge-controlled system; and
modify an association between the output model and at least one of the first input model or the second input model based on the feedback data.

7. The device of claim 1, wherein the sensor data values are collected by one or more sensors associated with the edge-controlled system, wherein the one or more sensors include at least one of:
an accelerometer,
a gyroscope, or
a Light Detection and Ranging ("LIDAR") sensor.

8. A non-transitory computer-readable medium, storing a plurality of processor-executable instructions to:
maintain, by a Multi-Access/Mobile Edge Computing device ("MEC"), a plurality of input models that each include respective sensor data values;
maintain, by the MEC, a plurality of output models that each include one or more actions to perform;
maintain, by the MEC, information associating respective input models, of the plurality of input models, to respective output models of the plurality of output models;
receive, by the MEC, via one or more wireless networks, input data from one or more edge-controlled systems, wherein a particular edge-controlled system of the one or more edge-controlled system includes one or more controllers, wherein the received input data is based on sensor data collected by one or more sensors that are communicatively coupled to the one or more controllers;
compare, by the MEC, the input data to the plurality of input models that are each based on respective sensor data values;
select, by the MEC and based on the comparing, a particular input model from the plurality of input models;
identify, by the MEC and based on the information associating respective input models to respective output models, a particular output model associated with the particular input model, wherein the one or more actions associated with the particular output model include a plurality of output instructions to actuate one or more devices connected to the one or more controllers; and provide, by the MEC, via the one or more wireless networks, the plurality of output instructions to the particular edge-controlled system, wherein the particular edge-controlled system generates a set of electrical signals based on the plurality of output instructions and provides the set of electrical signals to actuate the one or more devices connected to the one or more controllers.

9. The non-transitory computer-readable medium of claim 8, wherein the one or more wireless networks include a radio access network ("RAN"), and wherein the input data is received by the MEC from a base station of the RAN without the input data traversing a core network that is communicatively coupled to the RAN.

10. The non-transitory computer-readable medium of claim 8, wherein the one or more devices connected to the one or more edge-controlled systems include one or more motors, wherein actuating the one or more devices includes actuating the one or more motors.

11. The non-transitory computer-readable medium of claim 8, wherein the plurality of output instructions include instructions to actuate one or more logical systems, wherein the particular edge-controlled system generates the set of electrical signals to actuate the one or more connected devices based on the instructions to actuate the one or more logical systems.

12. The non-transitory computer-readable medium of claim 8, wherein the plurality of processor-executable instructions further include processor-executable instructions to:

receive feedback data from the particular edge-controlled system after providing the output instructions to the particular edge-controlled system; and modify the output model based on the feedback data.

13. The non-transitory computer-readable medium of claim 8, wherein the plurality of processor-executable instructions further include processor-executable instructions to:

receive feedback data from the particular edge-controlled system after providing the output instructions to the particular edge-controlled system; and modify an association between the output model and at least one of the first input model or the second input model based on the feedback data.

14. A method, comprising:

maintaining, by a Multi-Access/Mobile Edge Computing device ("MEC"), a plurality of input models that each include respective sensor data values;

maintaining, by the MEC, a plurality of output models that each include one or more actions to perform;

maintaining, by the MEC, information associating respective input models, of the plurality of input models, to respective output models of the plurality of output models;

receiving, by the MEC, via one or more wireless networks, input data from one or more edge-controlled systems, wherein a particular edge-controlled system of the one or more edge-controlled system includes one or more controllers, wherein the received input data is based on sensor data collected by one or more sensors that are communicatively coupled to the one or more controllers;

comparing, by the MEC, the input data to the plurality of input models that are each based on respective sensor data values;

selecting, by the MEC and based on the comparing, a particular input model from the plurality of input models;

identifying, by the MEC and based on the information associating respective input models to respective output models, a particular output model associated with the particular input model, wherein the one or more actions associated with the particular output model include a plurality of output instructions to actuate one or more devices connected to the one or more controllers; and providing, by the MEC, via the one or more wireless networks, the plurality of output instructions to the particular edge-controlled system, wherein the particular edge-controlled system generates a set of electrical signals based on the plurality of output instructions and provides the set of electrical signals to actuate the one or more devices connected to the one or more controllers.

15. The method of claim 14, wherein the one or more wireless networks include a radio access network ("RAN"), and wherein the input data is received by the MEC from a base station of the RAN without the input data traversing a core network that is communicatively coupled to the RAN.

16. The method of claim 14, wherein the one or more devices connected to the one or more edge-controlled systems include one or more motors, wherein actuating the one or more devices includes actuating the one or more motors.

17. The method of claim 14, wherein the plurality of output instructions include instructions to actuate one or more logical systems, wherein the particular edge-controlled system generates the set of electrical signals to actuate the one or more connected devices based on the instructions to actuate the one or more logical systems.

18. The method of claim 14, the method further comprising:

receiving feedback data from the particular edge-controlled system after providing the output instructions to the particular edge-controlled system; and modifying the output model based on the feedback data.

19. The method of claim 14, the method further comprising:

receiving feedback data from the particular edge-controlled system after providing the output instructions to the particular edge-controlled system; and modifying an association between the output model and at least one of the first input model or the second input model based on the feedback data.

20. The method of claim 14, wherein the sensor data values are collected by one or more sensors associated with the edge-controlled system, wherein the one or more sensors include at least one of:

an accelerometer, a gyroscope, or a Light Detection and Ranging ("LIDAR") sensor.

* * * * *